(12) United States Patent
Gardiner

(10) Patent No.: US 10,343,320 B2
(45) Date of Patent: Jul. 9, 2019

(54) METHOD FOR FABRICATING AN OBJECT

(71) Applicant: LAING O'ROURKE AUSTRALIA PTY LIMITED, North Sydney (AU)

(72) Inventor: James Bruce Gardiner, Chippendale (AU)

(73) Assignee: LAING O'ROURKE AUSTRALIA PTY LIMITED, North Sydney (AU)

( * ) Notice: Subject to any disclaimer, the term of this patent is extended or adjusted under 35 U.S.C. 154(b) by 518 days.

(21) Appl. No.: 15/033,100

(22) PCT Filed: Oct. 30, 2014

(86) PCT No.: PCT/AU2014/050324
§ 371 (c)(1),
(2) Date: Apr. 28, 2016

(87) PCT Pub. No.: WO2015/061855
PCT Pub. Date: May 7, 2015

(65) Prior Publication Data
US 2016/0263806 A1    Sep. 15, 2016

(30) Foreign Application Priority Data

Oct. 30, 2013  (AU) ................................ 2013904190

(51) Int. Cl.
*B29C 48/18* (2019.01)
*B29C 48/92* (2019.01)
(Continued)

(52) U.S. Cl.
CPC .............. *B29C 48/18* (2019.02); *B28B 1/001* (2013.01); *B29C 48/92* (2019.02); *B29C 64/106* (2017.08);
(Continued)

(58) Field of Classification Search
None
See application file for complete search history.

(56) References Cited

U.S. PATENT DOCUMENTS 4,254,599 A   3/1981  Maistre
5,121,329 A   6/1992  Crump
(Continued)

FOREIGN PATENT DOCUMENTS

CN   102656008 A   9/2012
CN   103099680 A   5/2013
(Continued)

OTHER PUBLICATIONS

International Search Report and Written Opinion dated Dec. 22, 2014, in connection with International Patent Application No. PCT/AU2014/050324, 9 pgs.
(Continued)

*Primary Examiner* — Edmund H Lee
(74) *Attorney, Agent, or Firm* — Marshall, Gerstein & Borun LLP

(57) ABSTRACT

A method for fabricating an object with a computer-controlled apparatus according to computer instructions derived from a computer model of the object. The method involves fabricating a plurality of beads of material, whereby at least a portion of the two beads abut and are arranged at an angle between 1-179° to each other. The two beads may be fabricated on respective notional planes which intersect each other. Alternatively, the two beads may be fabricated to form respective non-planar layers. Further alternatively, the two beads may be fabricated as three-dimensional beads. Also, the two beads may be curved and form respective planar layers.

8 Claims, 8 Drawing Sheets

(51) Int. Cl.
    *B28B 1/00*                 (2006.01)
    *B33Y 10/00*            (2015.01)
    *B32B 27/08*            (2006.01)
    *B32B 27/20*            (2006.01)
    *B32B 3/14*                (2006.01)
    *B32B 3/18*                (2006.01)
    *B32B 13/02*            (2006.01)
    *B32B 37/14*            (2006.01)
    *B29C 64/106*          (2017.01)
    *B32B 7/03*                (2019.01)

(52) U.S. Cl.
    CPC ................. *B32B 3/14* (2013.01); *B32B 3/18* (2013.01); *B32B 7/03* (2019.01); *B32B 13/02* (2013.01); *B32B 27/08* (2013.01); *B32B 27/20* (2013.01); *B32B 37/14* (2013.01); *B33Y 10/00* (2014.12); *B32B 2262/02* (2013.01); *B32B 2262/065* (2013.01); *B32B 2262/101* (2013.01); *B32B 2262/103* (2013.01); *B32B 2262/106* (2013.01)

(56) References Cited

U.S. PATENT DOCUMENTS

| | | | |
|---|---|---|---|
| 5,204,124 | A | 4/1993 | Secretan et al. |
| 5,402,351 | A | 3/1995 | Batchelder et al. |
| 5,764,521 | A * | 6/1998 | Batchelder .............. B29C 41/36 156/244.21 |
| 6,645,412 | B2 * | 11/2003 | Priedeman, Jr. ........ B29C 41/36 264/219 |
| 7,300,619 | B2 | 11/2007 | Napadensky et al. |
| 2008/0241392 | A1 | 10/2008 | Dimter et al. |
| 2011/0146874 | A1 | 6/2011 | Losey et al. |
| 2015/0091200 | A1 | 4/2015 | Mech |
| 2018/0207856 | A1* | 7/2018 | Seriani .................. B33Y 10/00 |
| 2018/0229448 | A1* | 8/2018 | Bastian ................. B33Y 10/00 |

FOREIGN PATENT DOCUMENTS

| | | |
|---|---|---|
| CN | 104275798 A | 1/2015 |
| JP | S62-255124 A | 11/1987 |
| JP | H02-239921 A | 9/1990 |
| JP | H03-158228 A | 7/1991 |
| JP | H05-345359 A | 12/1993 |
| WO | 2000020215 A1 | 4/2000 |
| WO | 2010019051 A1 | 2/2010 |

OTHER PUBLICATIONS

International Preliminary Report on Patentability (Chapter II) dated Nov. 18, 2015, in connection with International Patent Application No. PCT/AU2014/050324, 13 pgs.

Extended Search Report dated May 22, 2017, in connection with European Patent Application No. 14858349.5, 8 pgs.

Office Action dated Jul. 4, 2017, in connection with Chinese Patent Application No. 2014800600193; 23 pgs.

Written Opinion of the International Preliminary Examining Authority dated Jul. 10, 2015, in connection with International Patent Application No. PCT/AU2014/050324, 13 pgs.

Examination Report issued in Australian Patent Application No. 2014344811 dated Apr. 13, 2018.

Office Action issued in Japanese Application No. 2016-527462 dated Nov. 6, 2018.

* cited by examiner

METHOD FOR FABRICATING AN OBJECT

TECHNICAL FIELD

The present invention relates to a method for fabricating an object using a computer-controlled apparatus. In particular, the invention relates to a method for fabricating an object from a plurality of beads of material fabricated by the apparatus.

BACKGROUND TO THE INVENTION

Objects have been fabricated using various 'additive manufacturing' techniques, commonly known as '3D printing', for some time. Generally, additive manufacturing involves creating a three-dimensional computer model of an object, deriving computer instructions from the model to guide a computer-controlled apparatus to fabricate the object, and operating the computer-controlled apparatus, according to the computer instructions, to selectively fabricate material in successive, planar layers, thereby fabricating the object, such that the geometry of the object corresponds with the computer model.

Whilst known additive manufacturing techniques are able to reliably fabricate objects, they also have a number of disadvantages. For example, when objects are fabricated from planar layers, the layers typically have a weak mechanical connection and/or lack a significant chemical bond between adjacent layers. Due to this weak connection between layers, over time, or if subjected to particular loads or environmental conditions, the layers often separate from each other, known as 'delamination'. This is not only unsightly and but can also damage the structural integrity of the object, potentially resulting in the object being discarded or requiring repair.

Also, many known additive manufacturing techniques fabricate each layer of the object from a plurality of parallel, straight beads of material. It is therefore also common that when subjected to certain loads, the bond between adjacent beads will shear, further increasing the risk of the object delaminating.

Accordingly, it would be useful to provide a method or apparatus for fabricating objects having a strong bond between layers and/or beads of material, which is less prone to delamination when compared to prior art approaches. It would also be advantageous to provide a solution that avoids or ameliorates any of the disadvantages present in the prior art or which provides an alternative to the prior art approaches.

SUMMARY OF THE INVENTION

According to one aspect of the invention, there is provided a method for fabricating an object with a computer-controlled apparatus, the method comprising the steps of moving the apparatus and fabricating a first bead on a first notional plane, and moving the apparatus and fabricating a second bead on a second notional plane intersecting the first notional plane, at least a portion of the second bead abutting and arranged at an angle between 1-179° to at least a portion of the first bead.

Referring to another aspect of the invention, there is provided a method for fabricating an object with the computer-controlled apparatus where the method comprises the steps of moving the apparatus and fabricating at least one first bead to form a first non-planar layer, and moving the apparatus and fabricating at least one second bead to form a second non-planar layer, at least a portion of the at least one second bead abutting and arranged at an angle between 1-179° to at least a portion of the at least one first bead.

In an alternative aspect of the invention, there is provided a method for fabricating an object with the computer-controlled apparatus where the method comprises the steps of moving the apparatus and fabricating a first three-dimensionally curved bead, moving the apparatus and fabricating a second three-dimensionally curved bead having at least a portion abutting and arranged at an angle between 1-179° to at least a portion of the first three-dimensional bead.

In a further aspect of the invention, there is provided a method for fabricating an object with the computer-controlled apparatus where the method comprises the steps of moving the apparatus and fabricating at least one first curved bead to form a first planar layer, and moving the apparatus and fabricating at least one second curved bead to form a second planar layer, at least a portion of the at least one second curved bead abutting and arranged at an angle between 1-179° to at least a portion of the at least one first curved bead.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure relates to a method for fabricating an object from a plurality of beads of material with a computer-controlled apparatus, whereby at least a portion of two beads abut and are arranged at an angle between 1-179° to each other. The two beads may be fabricated on respective notional planes which intersect each other. Alternatively, the two beads may be fabricated to form respective non-planar layers. Further alternatively, the two beads may be fabricated as three-dimensional beads. Also, the two beads may be curved and form respective planar layers.

The computer-controlled apparatus is controlled by computer instructions that relate to the object geometry. The computer instructions are generally derived from a three-dimensional (3D) computer model of the object created with computer-aided design (CAD) software or other, similar software. The 3D model is created by a user operating the CAD software or by an application executing an algorithm to automatically generate the 3D model, or by a combination of these approaches. The computer instructions are typically derived by dissecting the 3D model into a plurality paths which material is fabricated along, often with one or more paths forming a layer of the object. The paths (and layers) may be automatically calculated by the CAD software or another application or this may be done manually. Alternatively, this may be due to a combination of automated and manual input according to predefined functional parameters, such as the user inputting typical forces which will act on the object, resulting in the layer geometry being optimised by software based on an analysis of these forces.

Figure 1:
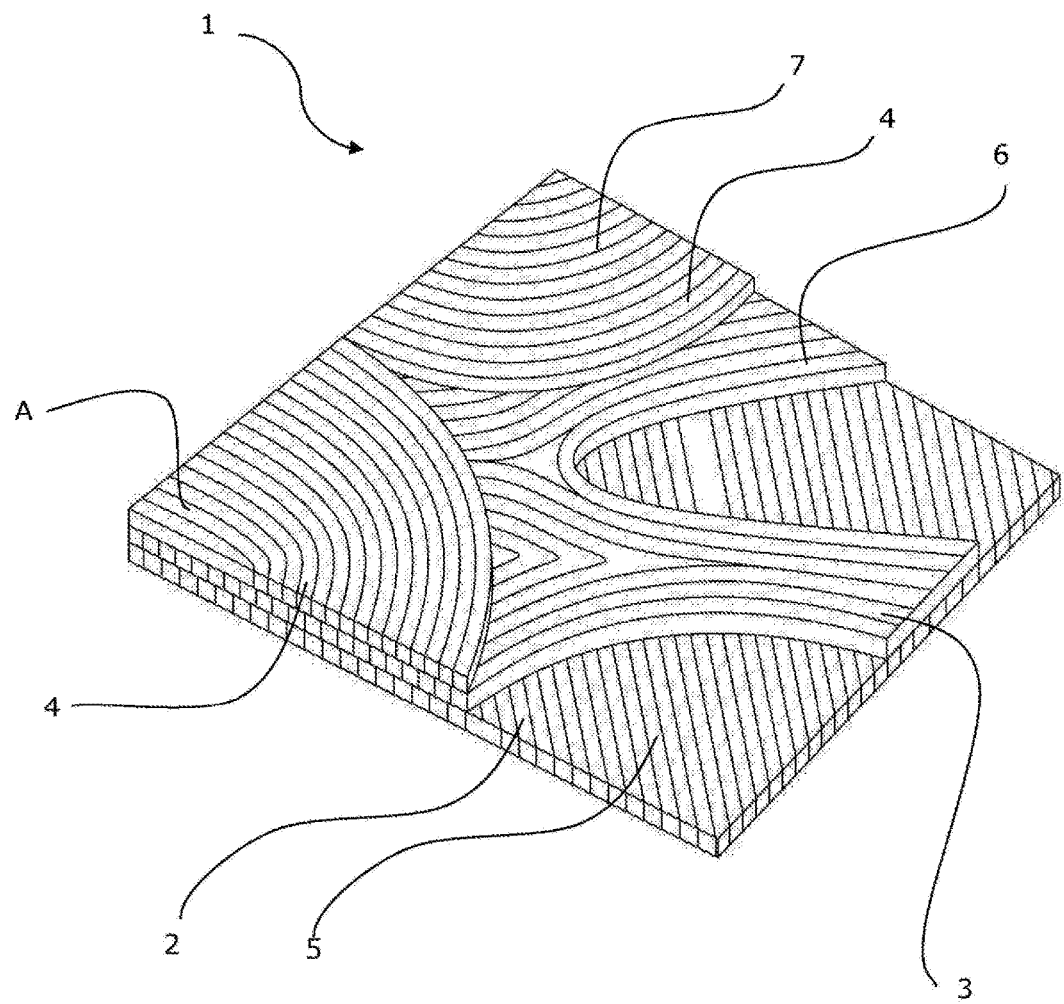
FIG. 1 is a perspective view of a substantially planar object.

In FIG. 1, an object 1 is shown. The object 1 has been fabricated from three substantially planar layers 2-4 with a computer-controlled apparatus (not shown) adapted to fabricate material in specific locations, guided by computer instructions relating to the object 1 geometry. The object 1 has a base layer 2, a mid layer 4 and an upper layer 4, where each subsequent layer is arranged on top of the previously fabricated layer. It is preferable that the apparatus fabricates the material by selectively depositing material in the specific locations, as is typical in Fused Deposition Modeling. In general, this specification refers to fabricating the material by deposition however it will be appreciated that other fabrication methods, such as selective solidification/curing of substantially liquid material, as is typical in Stereolithography, are also suitable.

The apparatus may be adapted to fabricate the material in the specific locations by moving fabrication means, such as a material extrusion nozzle, relative to a fixed substrate, or moving a platform relative to the fabrications means, or a combination of these approaches. This may involve the fabrication means being moved by a six-axis robotic arm relative to a base surface, thereby depositing material in the specific locations. Alternatively, this may involve the fabrication means being moved relative to a top surface of a liquid bath of material to selectively solidify portions of material, the portions being supported and moved (including rotation around one or more axes) by a build platform, thereby allowing the fabricated material to be moved and reorientated relative to the top surface and fabrication means.

Each layer 2-4 of the object 1 comprise a plurality of beads 5-7 of material. The beads 5-7 are formed by the apparatus depositing material along a plurality of paths (not shown), each path being collinear with a longitudinal axis of each bead. Each bead is formed from an extrusion of substantially liquid or molten material that cools and/or cures to form a solid bead.

The base layer 2 is formed from a regular array of substantially parallel beads 5. Adjacent layers 3, 4 are formed from an irregular array of curved beads 6, 7, at least some of the beads 6, 7 being arranged non-parallel and/or non-concentric to adjacent beads 6, 7, and some also being spaced apart from adjacent beads 6, 7.

The configuration of the layers 2-4 of the object 1 having beads 5-7 of material arranged in different directions to each other allows, the geometry of the object 1 to be optimised for different functional or aesthetic requirements, such as resisting a particular load exerted on the element 1. For example, longitudinal axes of beads 6, 7 of the mid layer 3 and upper layer 4 cross over each other, such that at least a portion of at least one bead 6, 7 abuts each other and is arranged at an angle between 1-179° to each other. Similarly, axes of beads 5 of the base layer 2 extend across axes of beads 6 of the mid layer.

In this arrangement, the bond between adjacent beads 5-7 in adjacent layers 2-4, which are the weakest regions of the object 1, are arranged at angle to each other, providing additional support to the weak bond regions and therefore increasing the rigidity of the object 1. For example, if a load is exerted on corner A of the object 1, the arrangement of the beads 5-7 ensures that the weak, bond regions between beads 7 in the top layer 4 are supported by the beads 6 of the mid layer 3 arranged thereacross and at angle thereto. Similarly, the beads 5 of the base layer 2 extend across the bond regions of beads 6 in the mid layer 3, providing further support to those beads 6. This 'cross-laminated' or weaved structure therefore decreases the chance of a bond between beads 5-7 in any layer 2-4 will fracture due to the load being exerted on corner A.

The arrangement of the beads 6, 7 of the mid layer 3 and upper layer 4 of the object 1 in curves may be calculated due to the input of various parameters, such as forces the object 1 will be exerted to during use. For example, where a region of the object 1 may be exerted to significant loading, the curves of beads 6, 7 are arranged to provide a substantial degree of cross-lamination, that is the angle of at least some adjacent beads 6, 7 in adjacent layers 3, 4 is in the region of 90°. Similarly, the various curvature of the beads 6, 7, and arrangement of beads 6-7 in the same layer 3, 4 relative to each other may be calculated in order to transfer force specifically through the layer 3, 4, or between layers 3, 4.

Figure 2:
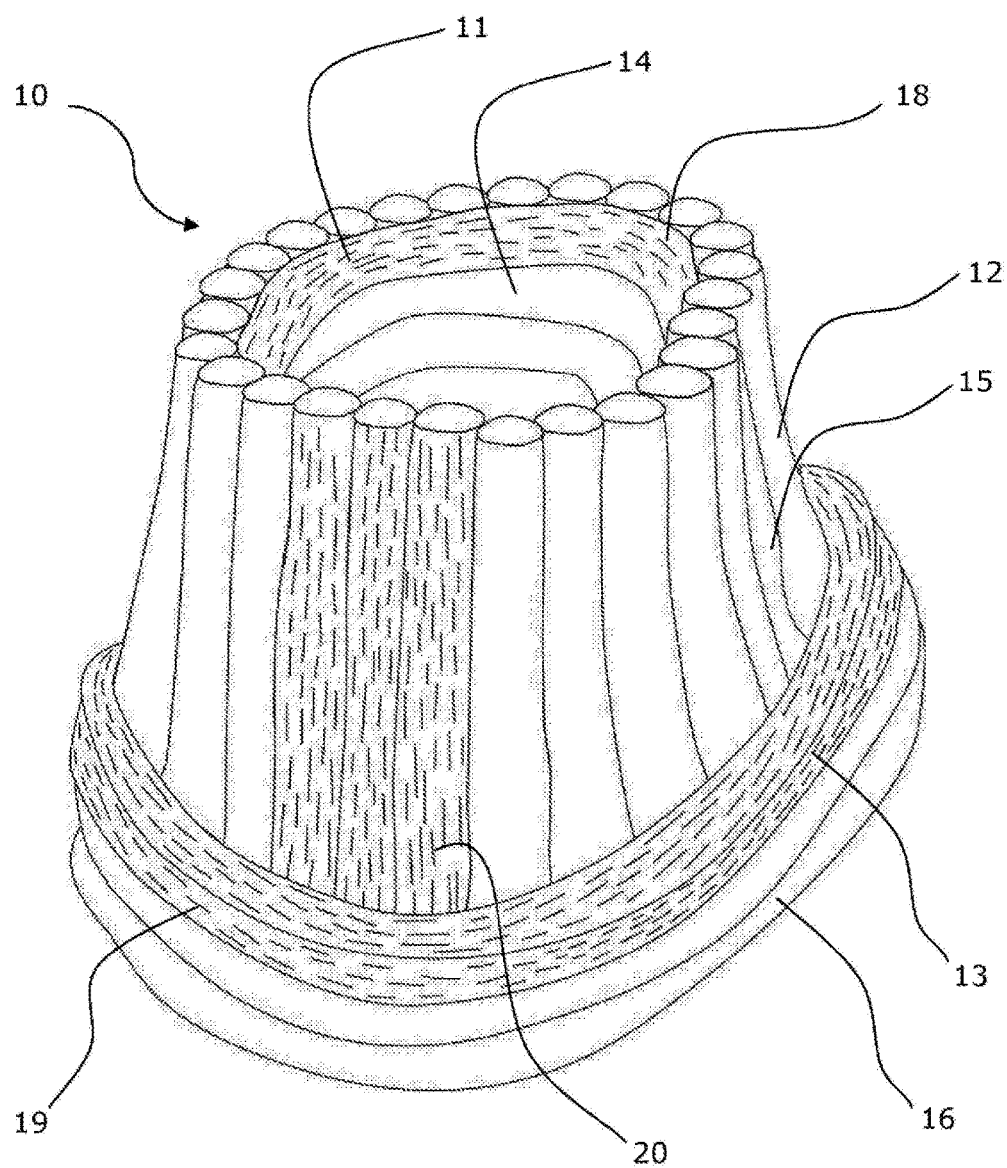
FIG. 2 is a perspective view of a freeform, cylindrical object.

FIG. 2, shows an alternative object 10. The object 10 has also been fabricated by the computer-controlled apparatus in layers 11-13, to form a core layer 11, mid layer 12 and outer layer 13. Similar to the object shown in FIG. 1, each layer 11-13 of object 10 comprises a plurality of beads of material 14-16 deposited by the apparatus along a respective plurality of paths (not shown).

The core layer 11 comprises a stack of substantially ring-shaped beads 14, the beads 14 fabricated by the apparatus extruding material on a respective plurality of notional first planes (not shown), each notional first plane arranged parallel to and spaced apart from an adjacent notional first plane, and also parallel to a floor surface 17.

The mid layer 12 comprises a plurality of column-like beads 15 extending away from the floor surface 17, abutting and enclosing a peripheral region of the core layer 11. Each column-like bead 15 is fabricated by the apparatus extruding material along a respective plurality of notional second planes (not shown), each notional second plane intersecting and arranged substantially perpendicular to the first notional planes.

The outer layer 13 comprises a further stack of ring-shaped beads 16 abutting and enclosing a peripheral region of the mid layer 12, the outer layer 13 fabricated by the apparatus extruding material on a respective plurality of notional third planes (not shown) arranged substantially parallel and spaced apart from each other, and substantially parallel to the notional first planes.

This arrangement of the layers 11-13 of the object 10 is specifically optimised for strength/stiffness requirements. As the orientation of the beads 14-16 of the core layer 11, mid layer 12 and outer layer 13 are substantially perpendicular to the beads 14-16 of an adjacent layer, the structure of the object forms a three-dimensional lattice of beads 14-16, which provides support to the bond regions between beads 14-16, and is particularly resistant to radial or bending forces exerted on the object 10.

Also, in the core layer 11 and outer layer 13, the position of the beginning/end of each bead 14, 16 may be staggered relative to the beginning/end of an adjacent bead 14, 16. For example, a first bead 14 may begin and end at 0°, a second bead 14 adjacent and on top of the first bead 14 may begin and end at 30°, and a third bead adjacent and on top of the second bead may begin and end at 60°, and so on. This results in the join in a single ring-shaped bead 14, 16, which is a weak region, being offset from the joins of adjacent ring-shaped beads, further increasing the rigidity of the object 10.

Whilst the first, second and third notional planes used during the fabrication of the object 10 are notional planar surfaces, it will be appreciated that one or more of these notional planes may be configured as a single or double-curved plane. For example, one or more of the notional planes may be formed from an extruded curve, thereby being curved in two dimensions. Alternatively, one or more notional planes may be formed from a three-dimensional surface, thereby being curved in all three dimensions. Where the notional planes are singularly curved or double-curved, it follows that a bead extruded thereon will also follow the curvature of the plane, thereby forming a curved bead.

The object 10 is preferably fabricated from a material capable of supporting its own weight immediately after being deposited by the apparatus, thereby allowing beads to be extruded vertically away from the floor surface 17. This may be due to the material being highly viscous and solidifying rapidly after deposition, the apparatus being adapted to rapidly cure the material by adjusting the temperature of the material, or by the apparatus adding a chemical or chemical catalyst to the material, or a combination of these or other methods. For example, the apparatus may be adapted to deposit more than one material simultaneously. In such embodiments, this allows the apparatus to concurrently deposit materials that initiate a chemical reaction upon contact with each other, such as the components of an epoxy resin, to accelerate the curing of the materials to form a solid bead. Alternatively, this may involve depositing a curing agent concurrent with the material configured to rapidly accelerate the curing of the material.

The properties of the material deposited by the apparatus to form the layers 11-13 of the object 10 may also be adjusted during the deposition process, thereby allowing a range of properties to be exhibited by each layer which are different to other layers. For example, the tensile strength, elasticity, porosity, density, fire resistance, of each layer may be adjusted. This may be achieved by varying the amount of material being deposited, varying the nozzle shape or diameter, mixing a plurality of feedstocks within a building material reservoir, or at the instance of deposition by depositing different materials from two or more adjacent deposition nozzles. Alternatively, one material may be substituted for another during the fabrication process by the apparatus alternating material supplies. Deposited material may also be varied according to a gradient, through the mixing of two or more materials during the deposition process. This allows, for example, objects to be fabricated having material deposited on one side of the element to be more dense than material deposited on the other side. Similarly, material could be alternated during the deposition process to change the object's properties relative to forces acting on the structure, increasing the strength of portions of the element which will be subject to increased loads.

For some applications, the strength of the object 10 is further enhanced by incorporating reinforcement fibres 18-20 into at least some of the beads 14-16. These reinforcement fibres 18-20 may be formed from organic or inorganic materials, such as steel, polymer, glass, carbon, aramid, vectran, coir, flax, hemp, abaca, or a bead may include a combination of fibres formed from different materials. The fibres 18-20 are generally formed from a stiffer material than the deposited material, increasing the stiffness or resistance of the bead 14-16, or may adjust other properties of the bead 14-16, such as conductivity, elasticity or sensing capabilities. The fibres 18-20 are preferably arranged collinear to the longitudinal axis of each bead 14-16 to enhance the resistance of the bead 14-16 to bending and/or fracturing. The fibres are preferably continuous throughout the bead 14-16, to further optimise the strength of the bead 14-16. Optionally, the quantity, configuration and material of the fibres 18-20 may be adjusted during the fabrication process, in order to fabricate different layers of object having different properties. The fibres may also include chopped non-continuous strands or fibres that are modified at the point of deposition to have other properties, such as crimped or curved profiles to improve adhesion within the material matrix.

Preferably, the apparatus is adapted to automatically integrate the fibres 18-20 within material before or during deposition of the material to form a bead 14-16. Where continuous fibres 18-20 are integrated into the beads 14-16, the fibres 18-20 are unwound from a feedstock, such as a drum, integrated with a liquid or molten build material supply and automatically cut by the apparatus when the apparatus finishes depositing a bead 14-16.

Figure 3:
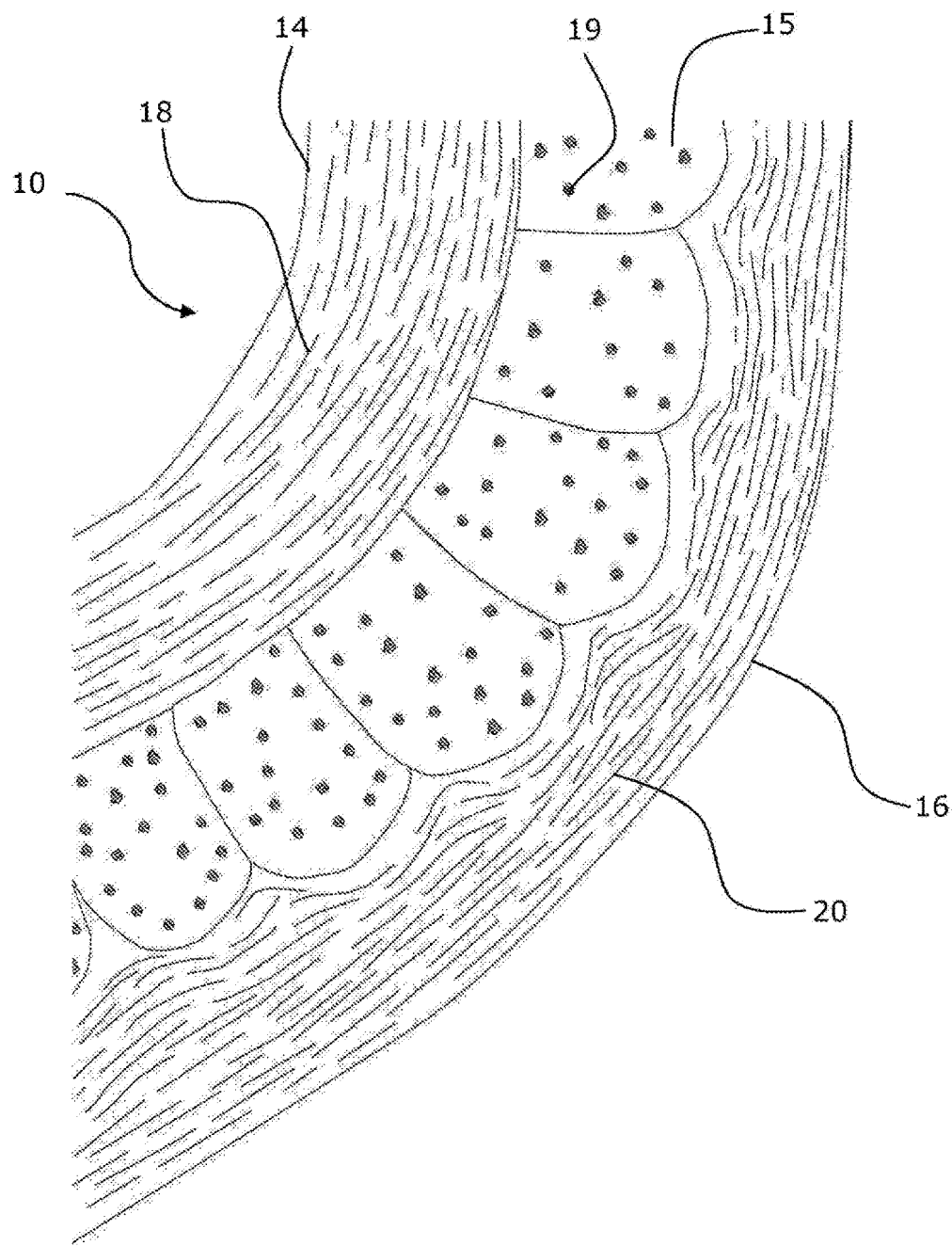
FIG. 3 is a cross-section, detailed view of the object illustrated in FIG. 2.

FIG. 3 is a cross-section, detail view of the object 10 shown in FIG. 2, more clearly showing the orientation of the reinforcement fibres 18-20 in each layer 11-13. Fibres 18 of the core layer 11 are arranged around the curve of the ring-shaped beads 14. Fibres 19 of the mid layer 12 are arranged along the length of each column-like bead 15 and are represented as a plurality of dots indicating a cross-section of each fibre 19.

Figure 4:
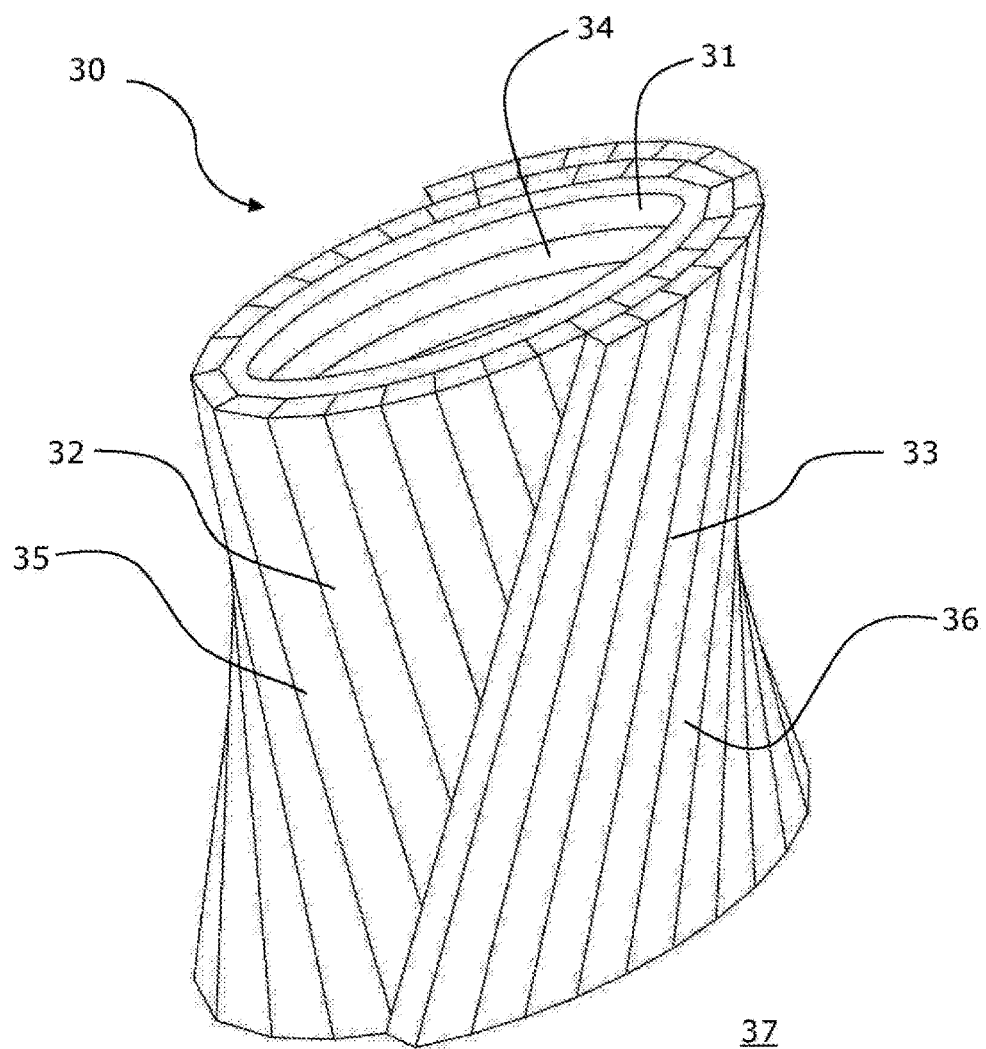
FIG. 4 is a perspective view of an alternative freeform cylindrical object.

FIG. 4 shows an alternative object 30. The object 30 has also been fabricated by the computer-controlled apparatus in layers 31-33, to form a core layer 31, a mid layer 32 and an outer layer 33.

The layers 31-33 are arranged similarly to layers 11-13 of object 10, whereby the core layer 31 comprises a stack of ring-shaped beads 34, and the mid layer 32 and outer layer 33 comprise a plurality of column-like beads 35, 36 which extend away from a floor surface 37 and abut and enclose the previously fabricated layer 31, 32. Each layer 31-33 is non-planar and has at least a portion which is single or double-curved, thereby extending in all three dimensions. For example, beads 35 are extruded by the apparatus away from the floor surface 37 to form a substantially helical shape wrapped around the core layer 31 in first direction of rotation. Beads 36 are then extruded by the apparatus away from the floor surface 37 to form a similarly substantially helical shape wrapped around the mid layer 32 in a second direction of rotation. This arrangement thereby ensure that at least a portion of at least some of the beads 34-36 abut each other and are arranged at an angle to each other between 1-179°. The extrusion of the helical shaped beads 35, 36 may be performed by moving the fabrication means of the apparatus relative to the floor surface 37 and/or moving and rotating the floor surface 37 relative to the fabrication means.

Figure 5:
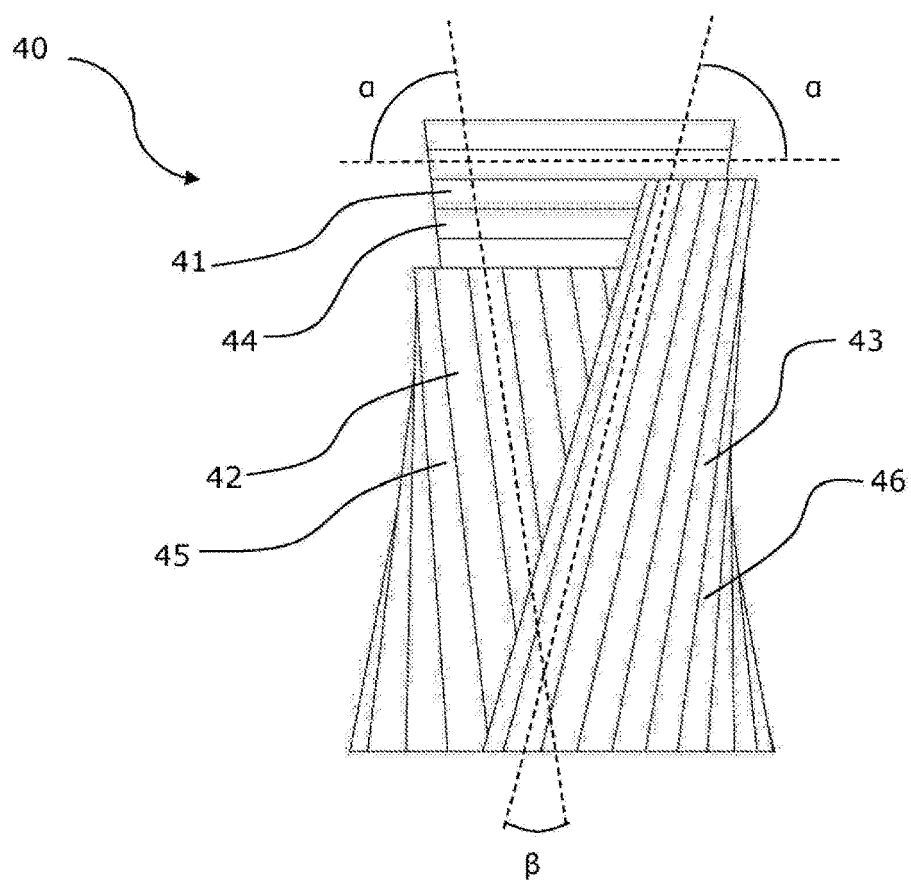
FIG. 5 is a front view of a further alternative object.

FIG. 5 shows a front view of an alternative object 40. Similar to object 10 and 30 shown in FIGS. 2-4, object 40 has been fabricated by the computer-controlled apparatus in layers 41-43, to form a core layer 41, mid layer 42 and outer layer 43. Each layer 41-43 is formed from a plurality of beads 44-46 deposited by the apparatus.

When viewed from a front elevation, as is shown in FIG. 5, the beads 44-46 are arranged at an angle to one another. For example, the beads 45, 46 of the mid layer 42 and outer layer 43, form an angle $\alpha$ with the beads 44 of the core layer 41. The beads 45 of the mid layer 42 also form an angle β with the beads 46 of the outer layer 43.

In general, as angles α, β are varied between 1-179°, the characteristics of the object 40 are adjusted, as the angular relationship between beads 44-46 of different layers 41-43 affects the strength of the bond between adjacent beads 44-46 in the same layer 41-43, and contributes towards the stiffness and durability of the object 40.

Figure 6:
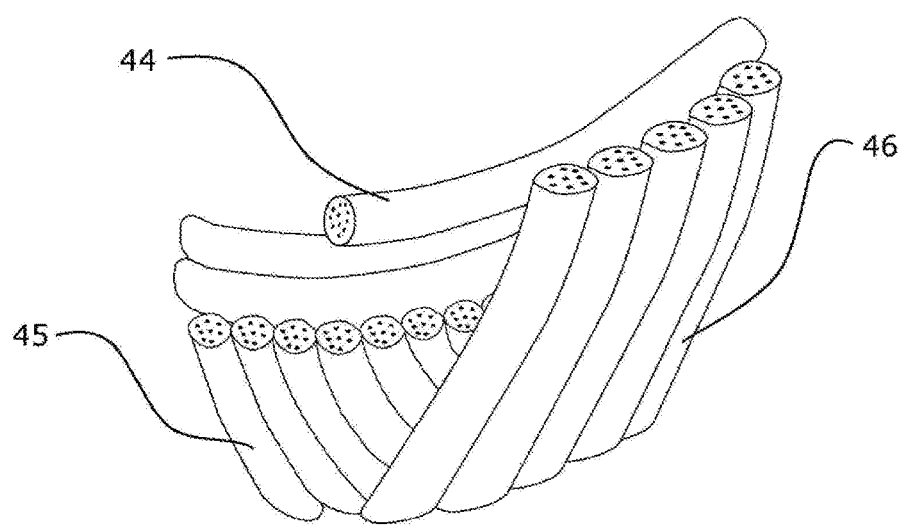
FIG. 6 is a detail, cross-sectioned view of the object shown in FIG. 5.

FIG. 6 is a detailed cross-sectional view of the object 40 shown FIG. 5, showing the curved arrangement of the beads 44-46.

In some instances, object 40 may be of a substantial size, being larger than 1 m$^3$ and in some instances larger than 20 m$^3$, in order to provide a function in a building or similar structure. In this scenario, the building material may be a cementitious material, such as concrete or geopolymer. Also, the apparatus may be adapted to deposit and/or cure such a material, such as adjusting the temperature of the material, or adding a chemical catalyst or other curing agent, prior to or during deposition.

Figure 7:
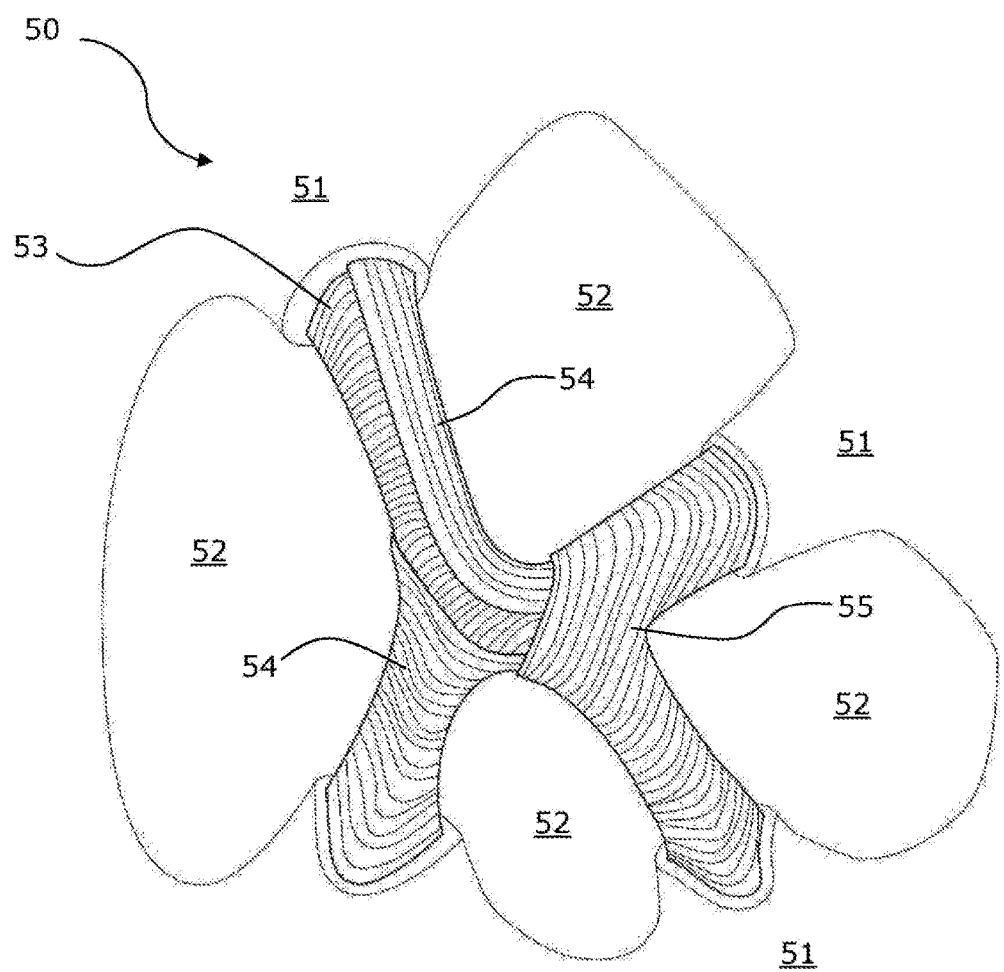
FIG. 7 is a detail view of an alternative object.

In FIG. 7 a further alternative object 50 is shown, having a plurality of interconnected branching sections 51 and voids 52. The object 50 has been fabricated by the computer-controlled apparatus in layers 53-55, to form an inner layer 53, mid layer 54 and outer layer 55. Each layer 53-55 is formed from at least one bead deposited by the apparatus.

The layers 53-55 are three-dimensional, non-planar layers which may be fabricated on a structure, such as a foam block, or in situ, such as to repair a structure, or as a stand-alone self-supporting element within an assembled structure. The beads of each layer 53-55 are fabricated in a substantially perpendicular orientation to the beads 53-55 of a previously fabricated layer to optimise the strength of the object 50. The mid layer 54 and outer layer 55 are shown partially fabricated to illustrate orientation of the beads of each layer 54, 55. However, partially fabricating layers 54, 55 may also be useful to reinforce specific sections of the object 50 and vary the strength or weight of these sections, or to provide a particular, decorative appearance, such as creating an open weave of material.

Figure 8:
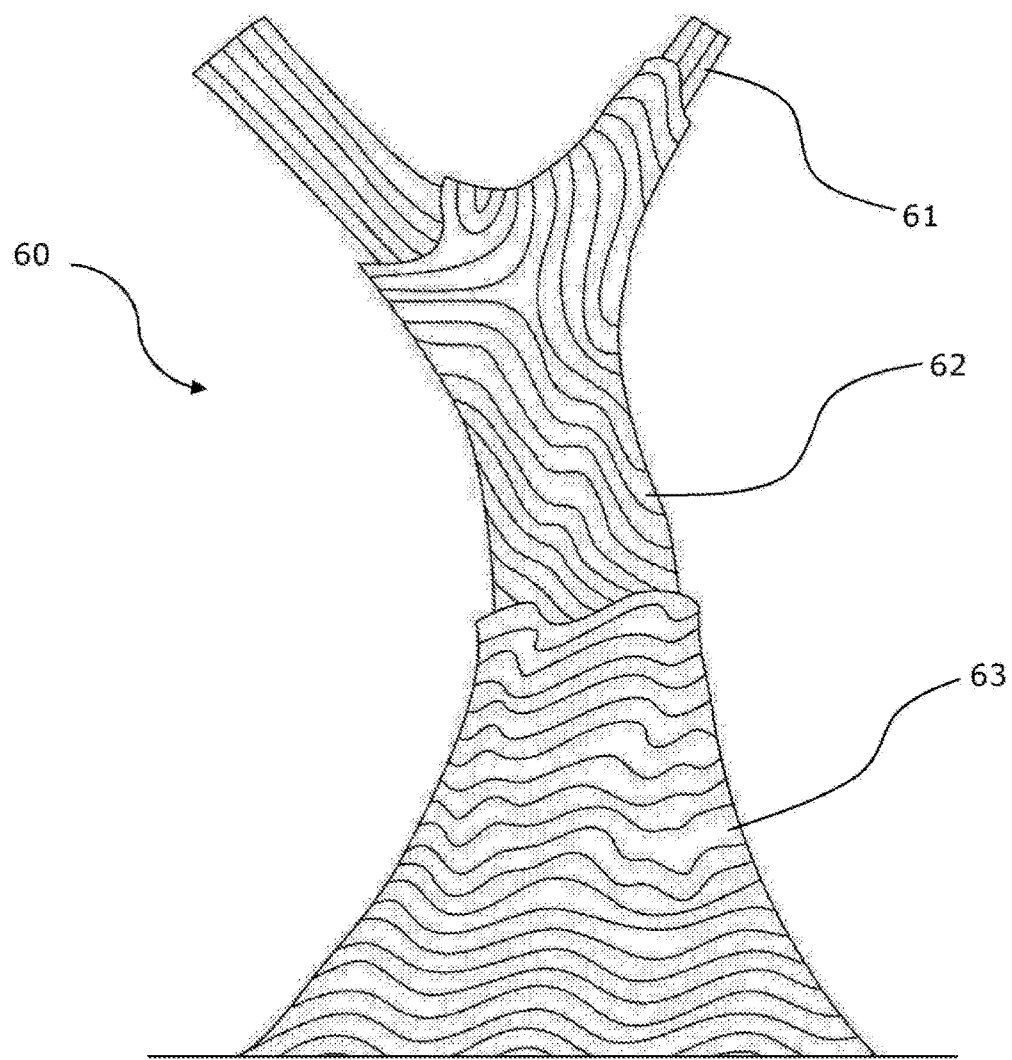
FIG. 8 is a front view of a further alternative, freeform object.

FIG. 8 is a front view of a further alternative object 60. The object 60 has been fabricated by the computer-controlled apparatus in layers 61-63, to form an inner layer 61, mid layer 62 and outer layer 63. Each layer 61-63 is formed from at least one bead deposited by the apparatus. Each bead is three-dimensionally curved, allowing a 'freeform' branched structure, such as a column node, to be formed.

Figure 9:
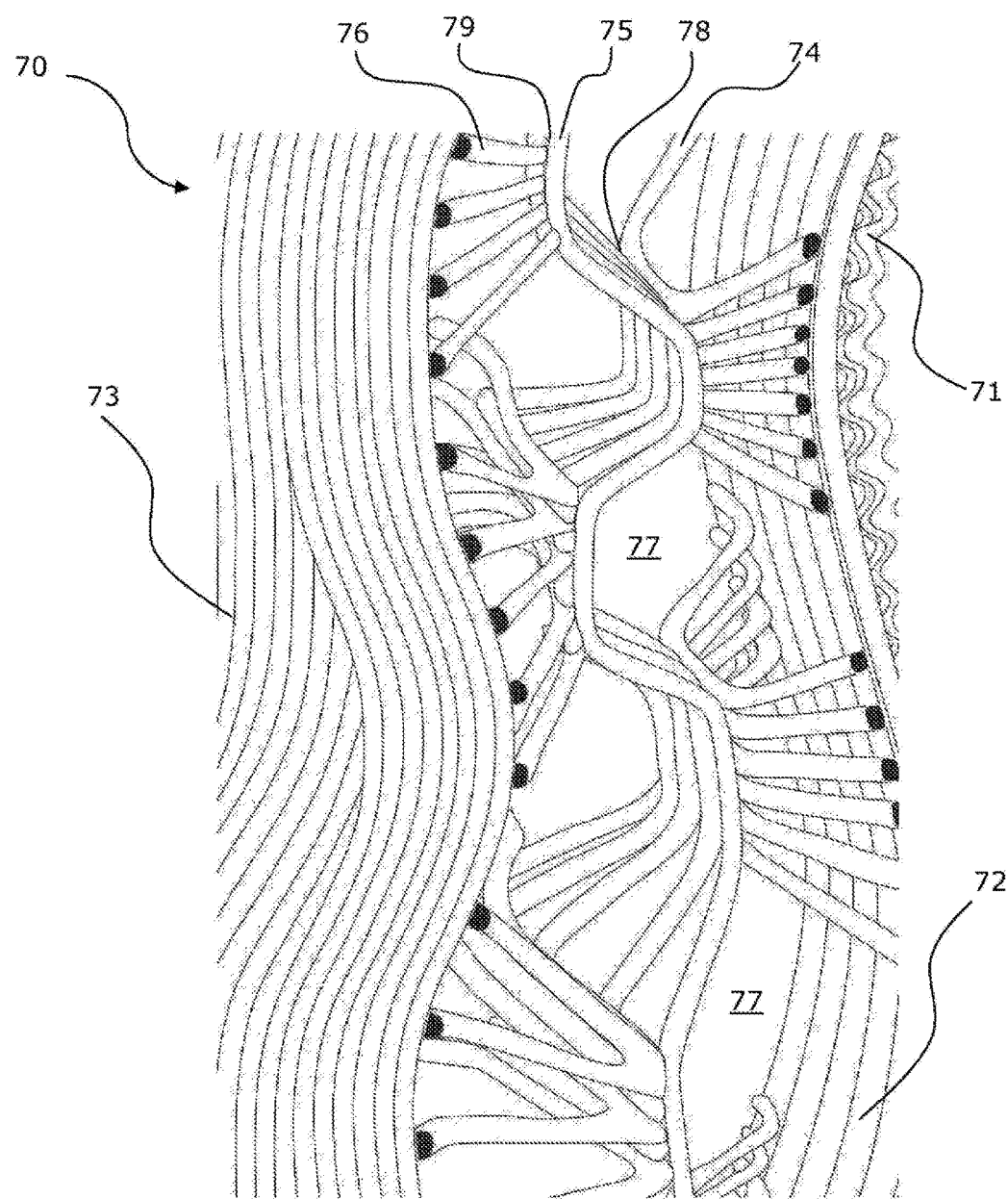
FIG. 9 is a detailed view of another alternative, freeform object.

FIG. 9 is a detailed view of a further alternative object 70. The object 70 has been fabricated by the computer controlled apparatus to form three layers 71-73. Two inner layers 71, 72 are spaced apart from an outer layer 73 by a plurality of three-dimensionally curved beads 74-76, forming a void therebetween. The three-dimensionally curved beads 74-76 are arranged in groups forming three non-planar layers, where only a portion of the beads 74-76 in each layer abut each other. A group of first beads 74 abut an inner layer 72 and generally extend in a first direction, a group of second beads 75 abut the first group at a first node 78 and generally extend in a second direction perpendicular to the first direction, and a group of third beads 76 abut the second group 75 at a second node 79, and the outer layer 73, and are generally arranged in the first direction. The portions of the three-dimensionally curved beads 74-76 which abut at the nodes 78, 79 are arranged at an angle to each other, thereby forming a crass-laminated junction at each node 78, 79.

The three-dimensionally curved beads 74-76 may be formed from a resilient material, thereby allowing the layers 72, 73 to be displaced relative to each other. The void 77 may also be filled with a specific gas or further material to affect the thermal and/or acoustic insulation properties of the object 70.

It will be apparent that obvious variations or modifications may be made to the present invention which are in accordance with the spirit of the invention and intended to be part of the invention. Although the invention is described above with reference to specific embodiments, it will be appreciated that it is not limited to those embodiments and may be embodied in other forms.

The invention claimed is:

1. A method for fabricating an object with a computer-controlled additive manufacturing apparatus, the method comprising the steps of:
    moving the apparatus and fabricating a plurality of first beads to form a first non-planar layer, each first bead having a longitudinal axis and at least some of the first beads at least partially extending longitudinally adjacently to each other; and
    moving the apparatus and fabricating a plurality of second beads to form a second non-planar layer at least partially enclosing the first non-planar layer, each second bead having a longitudinal axis and at least some of the second beads at least partially extending longitudinally adjacently to each other,
    wherein the at least some of the second beads abut the at least some of the first beads, and the longitudinal axes of the at least some of the second beads are arranged transverse to the longitudinal axes of the at least some of the first beads.

2. The method for fabricating an object according to claim 1, wherein the step of fabricating the first beads further comprises fabricating the first beads to form a core of the object, and the step of fabricating the second beads further comprises fabricating the second beads to form a shell of the object at least partially enclosing the core.

3. The method for fabricating an object according to claim 1, wherein the step of fabricating the at least some of the second beads further comprises the longitudinal axes of the at least some of the second beads being arranged substantially perpendicular to the longitudinal axes of the at least some of the first beads.

4. The method for fabricating an object according to claim 3, wherein the step of fabricating the at least some of the second beads further comprises the longitudinal axes of the at least some of the second beads being arranged in a different plane to the longitudinal axes of the at least some of the first beads.

5. The method for fabricating an object according to claim 1, wherein the apparatus is arranged relative to a surface, and at least one of fabricating the first beads and fabricating the second beads further comprises fabricating at least a portion of the respective bead along a notional path extending away from the surface.

6. The method for fabricating an object according to claim 1, wherein at least one of fabricating the first beads and fabricating the second beads further comprises fabricating the respective beads to be at least partially unsupported.

7. The method for fabricating an object according to claim 1, wherein at least one of fabricating the first beads and fabricating the second beads further comprises fabricating the respective beads to form at least a portion of the respective layer having double curvature.

8. The method for fabricating an object according to claim 1, wherein at least one of fabricating the first beads and fabricating the second beads further comprises fabricating the respective beads to form at least a portion of the respective layer having faceted surfaces.

* * * * *